(12) United States Patent
Sagefka et al.

(10) Patent No.: US 10,358,030 B2
(45) Date of Patent: Jul. 23, 2019

(54) METHOD FOR OPERATING A DRIVETRAIN FOR A MOTOR VEHICLE AND CORRESPONDING DRIVETRAIN

(71) Applicant: AUDI AG, Ingolstadt (DE)

(72) Inventors: Michael Sagefka, Kösching (DE); Sebastian Strasser, Ingolstadt (DE); Michael Bär, Ingolstadt (DE); Christian Knely, Ingolstadt (DE); Thomas-Willibald Meier, Ingolstadt (DE); Adrian Mihailescu, Aachen (DE); Stefan Hüfner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 156 days.

(21) Appl. No.: 15/311,076

(22) PCT Filed: May 8, 2015

(86) PCT No.: PCT/EP2015/000950
§ 371 (c)(1),
(2) Date: Nov. 14, 2016

(87) PCT Pub. No.: WO2015/172876
PCT Pub. Date: Nov. 19, 2015

(65) Prior Publication Data
US 2017/0096061 A1    Apr. 6, 2017

(30) Foreign Application Priority Data
May 15, 2014    (DE) ..................... 10 2014 007 090

(51) Int. Cl.
*B60K 17/34*    (2006.01)
*B60K 17/35*    (2006.01)
(Continued)

(52) U.S. Cl.
CPC ............ *B60K 17/35* (2013.01); *B60K 17/354* (2013.01); *B60K 23/0808* (2013.01);
(Continued)

(58) Field of Classification Search
CPC ...... B60K 17/34; B60K 17/35; B60K 17/351; B60K 23/0808; B60W 30/184; B60W 30/186; F16D 2500/5075
(Continued)

(56) References Cited

U.S. PATENT DOCUMENTS 5,456,641 A * 10/1995 Sawase ............... B60K 17/3462
                                                              180/197
8,645,026 B2    2/2014 Bär et al.
(Continued)

FOREIGN PATENT DOCUMENTS

CN    1496885 A    5/2004
CN    1863690 A    11/2006
(Continued)

OTHER PUBLICATIONS

Chinese Search Report dated Mar. 27, 2018 with respect to counterpart Chinese patent application 2015800250103.
(Continued)

*Primary Examiner* — Anne Marie M Boehler
(74) *Attorney, Agent, or Firm* — Henry M. Feiereisen LLC

(57) ABSTRACT

A method for operating a drivetrain for a motor vehicle, said method includes: reducing a transmission torque transmitted between a primary drive axle operatively connected with a secondary drive axle of the motor vehicle via a clutch configured to allow adjustment of the transmission torque when determining at the secondary drive axle a wheel slip which exceeds a defined slip threshold value.

9 Claims, 1 Drawing Sheet

(51) Int. Cl.
*B60K 23/08* (2006.01)
*F16D 48/06* (2006.01)
*B60K 17/354* (2006.01)

(52) U.S. Cl.
CPC ...... *F16D 48/06* (2013.01); *B60K 2023/0816* (2013.01); *B60K 2023/0833* (2013.01); *F16D 2500/1045* (2013.01); *F16D 2500/10431* (2013.01); *F16D 2500/3108* (2013.01); *F16D 2500/3109* (2013.01); *F16D 2500/3118* (2013.01); *F16D 2500/3125* (2013.01); *F16D 2500/5075* (2013.01); *F16D 2500/70408* (2013.01)

(58) Field of Classification Search
USPC .................................................. 180/233, 247
See application file for complete search history.

(56) References Cited

U.S. PATENT DOCUMENTS

| | | | |
|---|---|---|---|
| 8,649,929 B2 | 2/2014 | Strasser | |
| 9,193,381 B2 | 11/2015 | Bär et al. | |
| 9,199,648 B2 | 12/2015 | Bär | |
| 9,242,565 B2 | 1/2016 | Kleickmann et al. | |
| 9,387,852 B2 | 7/2016 | Meitinger et al. | |
| 2004/0035622 A1* | 2/2004 | Ito | B60K 17/35 180/197 |
| 2004/0059493 A1* | 3/2004 | Nagura | B60K 23/0808 701/89 |
| 2004/0176898 A1* | 9/2004 | Belvo | B60K 23/0808 701/82 |
| 2006/0113135 A1 | 6/2006 | Billig et al. | |
| 2006/0231310 A1* | 10/2006 | Suzuki | B60K 23/0808 180/197 |
| 2007/0095628 A1 | 5/2007 | Niederbacher | |
| 2012/0214641 A1 | 8/2012 | McCann et al. | |
| 2013/0343608 A1 | 12/2013 | Bär | |
| 2014/0005892 A1 | 1/2014 | Bär et al. | |
| 2015/0258889 A1* | 9/2015 | Sarai | B60K 23/0808 701/69 |
| 2015/0291027 A1 | 10/2015 | Strasser et al. | |
| 2015/0314678 A1* | 11/2015 | Ekonen | B60K 17/36 180/197 |

FOREIGN PATENT DOCUMENTS

| | | |
|---|---|---|
| DE | 199 54 282 A1 | 5/2001 |
| DE | 100 54 023 A1 | 5/2002 |
| DE | 103 23 567 A1 | 12/2003 |
| DE | 103 24 208 A1 | 12/2004 |
| DE | 103 33 650 A1 | 2/2005 |
| DE | 10 2005 035 211 A1 | 2/2007 |
| DE | 10 2007 006 803 A1 | 9/2007 |
| DE | 10 2006 014 072 A1 | 10/2007 |
| DE | 10 2008 035 556 A1 | 2/2010 |
| DE | 10 2009 005 378 A1 | 4/2010 |
| DE | 10 2008 055 897 A1 | 5/2010 |
| EP | 0 659 605 A2 | 6/1995 |

OTHER PUBLICATIONS

Translation of Chinese Search Report dated Mar. 27, 2018 with respect to counterpart Chinese patent application 2015800250103.
English International Search Report issued by the European Patent Office in International Application PCT/EP2015/000950.

\* cited by examiner

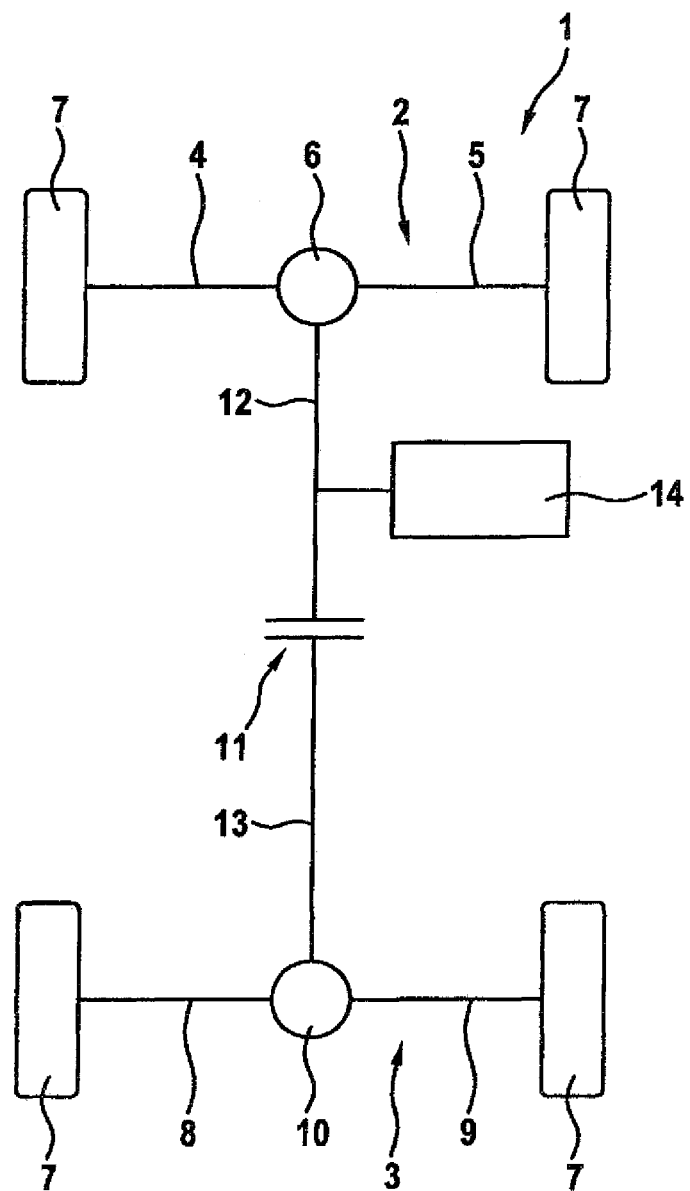

METHOD FOR OPERATING A DRIVETRAIN FOR A MOTOR VEHICLE AND CORRESPONDING DRIVETRAIN

CROSS-REFERENCES TO RELATED APPLICATIONS

This application is the U.S. National Stage of International Application No. PCT/EP2015/000950, filed May 8, 2015, which designated the United States and has been published as International Publication No WO 20151172876 and which claims the priority of German Patent Application, Serial No. 10 2014 007 090.5, filed May 15, 2014, pursuant to 35 U.S.C. 119(a)-(d).

BACKGROUND OF THE INVENTION

The invention relates to a method for operating a drivetrain for a motor vehicle, which at least one primary drive axle and at least one secondary drive axle, which are operatively connected with each other via a clutch with an adjustable transmission torque. The invention also relates to a drivetrain for a motor vehicle.

The method serves for operating the drivetrain, to thereby for example drive and in particular accelerate, the motor vehicle. The drivetrain is provided for use in the motor vehicle so that the invention also relates to a motor vehicle with a correspondingly configured drivetrain. The drivetrain has the at least one primary drive axle and the at least one secondary drive axle. These are coupled with each other via the clutch, wherein the transmission torque of the clutch i.e., the torque that is transmitted via the clutch between the primary drive axle and the secondary drive axle can be adjusted.

The primary drive axle is an axle of the drivetrain or the motor vehicle, which in the presence of torque that is directed to drive the motor vehicle is always impinged with this torque or at least a portion thereof. The secondary axle can selectively be impinged with the torque or a portion of the torque. For this purpose the clutch is provided which is situated between the primary drive axle and the secondary drive axle. In a first operating state of the clutch the secondary drive axle is completely decoupled from the primary drive axle. Correspondingly the motor vehicle is only driven by means of the primary drive axle. The transmission of a torque from the primary drive axle to the secondary drive axle does thus not occur. In this case the transmission torque is zero. In a further operating state of the clutch the transmission torque is greater than zero, so that the transmission torque is transmitted from the primary drive axle top the secondary drive axle. In this case also the secondary drive axle contributes to propulsion of the motor vehicle.

SUMMARY OF THE INVENTION

The motor vehicle according to the description above has at least temporarily multiple, in particular at least two, driven axles, but also enables the drive of only the at least one primary drive axle in particular exactly a single primary drive axle. For example the primary drive axle is permanently and/or rigidly operatively connected with a drive device of the motor vehicle or the drivetrain. The drive device has hereby for example at least one drive aggregate for example an internal combustion engine and/or an electric machine and a starting clutch. The primary drive axle is or can be operatively connected with the drive aggregate in particular via the starting clutch, while an operative connection between the secondary drive axle and the drive aggregate is preferably present only via the primary drive axle, i.e., overall the clutch, the primary drive axle and the starting clutch.

The clutch can for example be configured as a friction clutch, in particular as a multidisc-lock-transmission clutch. The maximally transmittable torque of the clutch is for example adjusted by open loop and/or closed loop control via an actuating mechanism or an actuator. So long as the clutch slip, corresponding to a normed difference between the input and the output torque of the clutch, is different form zero the torque adjusted by the actuating mechanism corresponds to the actually transmitted torque. As soon as the clutch slip is zero the value of the actually transmitted torque can no longer be determined. Only the maximally transmittable torque corresponding to the adjusted torque, which can be referred to as transmission torque, is known.

When in case of a clutch slip of zero the transmission torque is further increased this is referred to due to the unnecessarily high pressure force on the clutch as clutch transmission over-pressing, in particular in the case of the multidisc clutch. Such a clutch over-pressing however has multiple disadvantages. On one hand the actuating mechanism consumes more energy and may cause noises, which are perceived as acoustic stress by the driver of the motor vehicle. Also an actuating mechanism is subjected to an unnecessarily high stress, which adversely affects its service life. Also the determination of the actually transmitted torque is only possible with low accuracy because the value range in which it is located is increased.

It is an object of the invention to propose a method for operating a drivetrain of a motor vehicle with which an unnecessarily high transmission torque, in particular a clutch over pressing, can be avoided while at the same time maintaining or even improving traction.

This is achieved according to the invention with a method with the features of the independent claim. Hereby it is provided that the transmission torque is reduced when a wheel slip is recognized at the secondary drive axle, which eschewed s a defined slip threshold value. For example it is thus provided to determine the transmission torque in particular by way of a driver request of a drive of the motor vehicle. For example the transmission torque is provided by a control device of the drivetrain or the motor vehicle. It can be provided that defined transmission torques are first adjusted at the clutch. When subsequently the wheel slip is recognized which exceeds the defined slip threshold value the transmission torque is reduced and adjusted at the clutch or the transmission torque at the clutch is reduced. As an alternative it is of course provided that after the determination of the transmission torque but prior to its adjustment at the clutch the transmission torque is reduced.

In the case of a high wheel slip which lies in the glide slip range, a loss of drive force has to be expected. The acceleration capacity of the motor vehicle, which is also referred to as traction, is influenced by the distribution of the drive torque to the axles, in particular the primary drive axle and the secondary drive axle. The behavior of wheels provided at the axles hereby plays an important role. The wheel force applicable by a wheel in longitudinal direction in particular depends on the wheel load and the wheel slip. The wheel slip κ is calculated from the rotational speed $V_{Wheel}$ of the wheel and the wheel center point speed $V_{WheelCenter}$ according to the relationship $$\kappa = \frac{v_{Wheel} - v_{WheeCenter}}{v_{Wheel}}$$

The adhesion coefficient μ (also referred to as friction value) is defined as the ratio of the applicable longitudinal force $F_x$ to the wheel load $F_z$ for longitudinal dynamical tire load. In this case the following relationship applies $$\mu = \frac{F_x}{F_z}.$$

For the case that the speed of the secondary drive axle is lower than that of the primary drive axle the torque transmitted by means of the clutch to the secondary drive axle is increased by increasing the transmission torque, maybe even up to a maximally transmittable torque. This solution is useful in the range of the deformation slip. At a higher wheel slip this is not optimal however because the described clutch over pressing may occur with simultaneous longitudinal force loss at the secondary drive axle. An example for this is the accelerated drive with wheel slips above the deformation slip at all driven axles, in particular the primary drive axle and the secondary drive axle. In such a situation an increase of the transmission torque and with this the wheel slip at the wheels of the secondary axle leads to a reduction of the transmitted or transmittable longitudinal force.

For this reason it is provided that the transmission torque is reduced as soon as a driving situation with high wheel slip is recognized. In this case the wheel slip which exceeds the slip threshold value has thus to be recognized at the secondary drive axle, the reduction of the transmission torque leads to a lower pressing force at the clutch in particular while the actually transmitted torque remains the same.

A further embodiment of the invention provides that the clutch is configured as a multidisc clutch and the transmission torque is adjusted by adjusting a pressing force of the multidisc clutch. Such a configuration of the clutch was mentioned above. The multidisc clutch is for example constructed as a multidisc-lock-transmission clutch. As a result of correspondingly adapting or adjusting the pressing the desired transmission torque can be adjusted at the multidisc clutch.

An embodiment of the invention provides that the wheel slip at the secondary drive axle is recognized when the secondary axle rotational speed exceeds the primary axle rotational speed such a difference between the secondary axle rotational speed at the primary axle rotational speed can in particular result from elasticities of the drivetrain. When for example a lower slip is present at the wheel of the primary drive axle than at the wheels of the secondary drive axle eh rotation speed of the primary drive axle decreases compared to the rotational speed of the secondary drive axle at least for a short period of time. The rational speed difference thus indicates that the wheel slip at the wheels of the secondary drive axle is greater than at the wheels of the primary drive axle. Correspondingly also the wheel slip at the secondary drive axle is recognized and the reduction of the drive torque initiated.

A preferred embodiment of the invention provides that the wheel slip is recognized at the secondary drive axle when a vehicle speed determined from the primary axle rotational speed and/or the secondary axle rotational speed exceeds the actual vehicle speed. From the rotational speed of at least one of the axles preferably multiple or all axles of the motor vehicle a theoretical vehicle speed can be at least approximately determined. This vehicle speed is then compared with the actual present vehicle speed. When the latter is lower it can be concluded that at least at the wheels of the secondary drive axle or at the wheels of the primary drive axle and also at the wheels of the secondary drive axle wheel slip is present. Preferably the wheel slip at the secondary drive axle is only recognized when a theoretical vehicle speed exceeds the actual vehicle speed by a defined speed difference wherein this speed tolerance is for example determined by way of the slip threshold value. The actual vehicle speed can be determined in any desired manner.

A further advantageous embodiment of the invention provides that the wheel slip of the secondary dive axle is recognized when the slip at the primary drive axle and also the slip at the secondary drive axle exceed the slip threshold value. The reduction of the transmission torque is thus not already triggered when only the slip at the secondary drive axle exceeds the slip threshold value. Rather this only occurs when the slip at the primary dive axle and at the secondary drive axle are greater than the defined slip threshold value.

A further embodiment of the invention provides that the transmission torque is reduced to a setpoint transmission torque, which corresponds to a torque that can be maximally applied via the secondary drive axle. The latter is for example determined with the relationship $$M_{axle} = F_{z,axle} \cdot \mu_x \cdot r_{dyn}$$

Wherein $M_{axle}$ is the maximally applicable torque, $F_{z,axle}$ the axle load, $\mu_x$ the road friction value and $r_{dyn}$ the dynamic wheel radius of the wheels of the secondary drive axle. The reduction of the set transmission torque of the set point transmission torque to the maximally applicable torque preferably achieves that the wheel slip at the secondary drive axle is reduced so that the road friction value or the adhesion coefficient between the wheel and the road increases. Correspondingly the reduction of the transmission torque can improve the traction of the motor vehicle. The transmission torque is reduced to the setpoint transmission torque which corresponds to the maximally applicable torque.

In a further preferred embodiment of the invention it is provided that the maximally applicable torque is determined by using one of the following variables; an axle load of the secondary drive axle, a road friction value, a dynamic wheel radius of a wheel of the secondary drive axle and a transmission ratio between the clutch and the secondary drive axle. The axle load $F_{z,axle}$, the road friction value $\mu_x$ and the dynamic wheel radius $r_{dyn}$ were mentioned above. In addition the transmission ratio can be taken into account for the maximally applicable torque or the setpoint transmission ratio. The transmission ratio is for example assigned to a transmission, which is present between the clutch and the secondary drive axle. The setpoint transmission torque is determined form the relationship $$M_{clutch} = i \cdot M_{axle}.$$

In a further embodiment of the invention it is provided that the road friction value is determined from a longitudinal acceleration of the motor vehicle. For determining the actual road friction value one or multiple sensors can be used. For example a longitudinal acceleration sensor is used as sensor. The road friction value results for example approximately from a division of the maximal longitudinal acceleration by the gravity constant g. this estimated road friction value can be used for the calculation of the setpoint transmission torque. In addition or as an alternative also an optical sensor can be used for determining the road friction value.

For determining the axle load of the secondary drive axle one or multiple sensors can be used. Also in this case the longitudinal acceleration for example determined with a longitudinal acceleration sensor is sufficient to calculate the dynamic load fluctuations.

A further embodiment of the invention provides that the transmission torque is increased again when the clutch slip of the clutch exceeds a maximal value. When the reduced transmission torque is too low so that the clutch slip occurring in the clutch excessively increases, the transmission torque is increased again. Such a situation is preferably recognized by way of the deviation between the primary axle rational speed and the secondary axle rotational speed. The torque transmitted to the secondary drive axle is set to a higher level by closed loop and/or open loop control by means of the deviation between the rotational speeds. Hereby a torque tolerance can be permitted so that the increase of the transmission torque only occurs when the secondary axle rotational speed is smaller by this rotational speed than the primary axle rotational speed.

Preferably the transmission torque is increased until the clutch slip of the clutch is smaller than the maximal value or alternatively equal to zero. After the increase it is tested again whether the wheel slip at the secondary drive axle exceeds the determined slip threshold value and it is correspondingly reacted. In this respect, the transmission torque is thus reduced again when the wheel slip exceeds the slip threshold value.

For example it is also provided to operated the drivetrain initially in a first operating mode in which the transmission torque—if required—is reduced. When it is determined that the clutch slip exceeds the maximal value it is changed from the first operating mode to a second operating mode in which the transmission torque is increased again. When the clutch slip of the clutch is smaller again than the maximal value or equal as a result of increasing the transmission torque it is changed again into the first operating mode. In this operating mode it is tested again whether the wheel slip exceeds the slip threshold value.

The invention also relates to a drivetrain for a motor vehicle with at least one primary drive axle and at least one secondary drive axle, which are operatively connected with each other via a clutch with an adjustable transmission torque. Hereby it is provided that the drivetrain is configured to reduce the transmission torque when at the secondary drive axle a wheel slip is recognized that exceeds a defined slip threshold value. The advantages of such an embodiment of the drivetrain or such a method were mentioned above. The method and the drivetrain can be modified according to the description above so that reference is made thereto.

BRIEF DESCRIPTION OF THE DRAWING

In the following the invention is explained in more detail by way of the exemplary embodiments shown in the drawing without limiting the invention. Hereby the sole FIGURE shows a schematic representation of a drivetrain for a motor vehicle.

DETAILED DESCRIPTION OF PREFERRED EMBODIMENTS

The FIGURE shows a schematic representation of a drivetrain 1, which is for example a component of a not further illustrated motor vehicle. the drivetrain 1 has for example a primary drive axle 2 and a secondary drive axle 3 the primary drive axle 2 has for example subaxles 4 and 5 which are operatively connected with each other via an axle differential 6. At each subaxle 4 and 5 a wheel 7 is provided. Analog thereto the secondary drive axle 3 has subaxles 8 and 9 which are operatively connected to teach other via an axle differential 10. At the subaxles 8 and 9 also wheel s 7 are provide.

The primary drive axle 2 and the secondary drive axle 3 are operatively connected via a clutch 11 with an adjustable transmission torque. For example the subaxle 4 and 5 or 8 and 9 are constructed as output shafts of the respective axle differential 6 or 10 while input shafts 12 and 13 of the axle differentials 6 and 10 can be coupled by means of the clutch 11.

The drivetrain 1 has further a drive device 14. The drive device for example has a here not further illustrated drive aggregate for example an internal combustion engine and/or an electric machine. The drive device 14 can further have a starting clutch. The drive device 14 is preferably permanently operatively connected with the primary drive axle 2 or the corresponding input shaft 12. An operative connection between the derive device 14 and the secondary axle 3 is only present via the clutch 11. This means that the drivetrain 1 or the corresponding motor vehicle has a permanently driven axle i.e., the primary drive axle 2, and a merely temporarily driven axle i.e., the secondary drive axle 3.

During a driving operation of the drivetrain 1 a defined transmission torque is set at the clutch 11. When it is subsequently determined that a wheel slip occurs at the secondary drive axle 3 which exceeds a defined slip threshold value the transmission torque is reduced. The reduction of the transmission torque hereby occurs to the degree until the clutch slip of the clutch 11 reaches or exceeds a maximal value. In the latter case, i.e., when the clutch slip is greater than the maximal value the transmission torque can be increased again preferably until the clutch slip corresponds to or is smaller than the maximal value.

With such an approach the presence of an excessive transmission torque at the clutch 11 is prevented and at the same time the traction to the motor vehicle improved. The latter is the case because the wheel slip at the secondary drive axle 3 or the wheels 7 of the secondary drive axle 3 is reduced so that preferably the adhesion coefficient between the wheels 7 of the secondary drive axle 3 and a ground on which the motor vehicle is situated is increased. The slip at the secondary drive axle 3 is for example determined by determining the slip at the wheels 7 of the secondary axle 3 and determining therefrom the average value. An analogous approach can be taken when the slip of the primary axle 2 is required.

The invention claimed is:

1. A method for operating a drivetrain for a motor vehicle, said method comprising:
    determining a wheel slip at a secondary drive axle of the motor vehicle; and
    reducing a transmission torque transmitted by a clutch operatively connected between a primary drive axle of the motor vehicle and the secondary drive axle, while an actually transmitted torque remains unchanged, when the wheel slip at the secondary drive axle exceeds a defined slip threshold value.

2. The method of claim 1, wherein the clutch is configured as a multidisc clutch and the transmission torque is adjusted by adjusting a pressing force of the multidisc clutch.

3. The method of claim 1, wherein the wheel slip at the secondary drive axle is recognized when a rotational speed of the secondary axle exceeds a rotational speed of the primary axle.

4. The method of claim 1, wherein the wheel slip at the secondary drive axle is recognized when a vehicle speed determined from at least one of a rotational speed of the primary drive axle and a rotational speed of the secondary drive axle exceeds an actual speed of the motor vehicle.

5. The method of claim 1, wherein the wheel slip at the secondary drive axle is recognized when a slip at the primary drive axle and a slip at the secondary dive axle exceed the slip threshold value.

6. The method of claim 1, wherein the transmission torque is reduced to a setpoint transmission torque which corresponds to a torque that is maximally applicable via the secondary drive axle.

7. The method of claim 6, wherein the maximally applicable torque is determined by using at least one variable of the group consisting of an axle load of the secondary dive axle, a road friction value, a dynamic wheel diameter of a wheel of the secondary drive axle and a transmission ratio between the clutch and the secondary drive axle.

8. The method of claim 7, wherein the road friction value is determined from a longitudinal acceleration of the motor vehicle.

9. The method of claim 1, wherein the transmission torque is increased again when clutch slip of the clutch exceeds a maximal value.

* * * * *